July 22, 1958     M. E. ACHLER ET AL     2,844,199
VERTICAL VENETIAN BLIND CONSTRUCTION
Filed Aug. 6, 1953     6 Sheets-Sheet 1

INVENTORS
Maurice E. Achler and
Albert H. Milstine
BY
Nathan N. Kraus
Frank H. Marks
Attorneys

July 22, 1958 M. E. ACHLER ET AL 2,844,199
VERTICAL VENETIAN BLIND CONSTRUCTION
Filed Aug. 6, 1953 6 Sheets-Sheet 2

INVENTORS
Maurice E. Achler and
Albert H. Milstine
BY
Nathan K. Kraus
Frank H. Marks
Attorneys

July 22, 1958 M. E. ACHLER ET AL 2,844,199
VERTICAL VENETIAN BLIND CONSTRUCTION
Filed Aug. 6, 1953 6 Sheets-Sheet 3

INVENTORS
Maurice E. Achler and
Albert H. Mistine
BY
Nathan N. Frans
Frank H. Marks
Attorneys

United States Patent Office 2,844,199
Patented July 22, 1958

2,844,199

VERTICAL VENETIAN BLIND CONSTRUCTION

Maurice E. Achler and Albert H. Milstine, Chicago, Ill., assignors of two-twentieths to Harry Shapiro, Chicago, Ill.

Application August 6, 1953, Serial No. 372,629

3 Claims. (Cl. 160—173)

This invention relates to Venetian blinds and is more particularly concerned with improvements in the vertical Venetian blind constructions disclosed in our copending applications Serial No. 278,857, filed March 27, 1952, now U. S Patent 2,827,956, issued March 25, 1958, entitled Vertical Venetian Blind, and Serial No. 317,778, filed October 30, 1952, now U. S. Patent 2,828,817, issued April 1, 1958, entitled Venetian Blind Construction.

An object of our invention is to provide improved tilt-tube construction.

Another object is to provide means for insuring the proper tilting of all of the slats.

A further object is to provide against excessive deflection of the tilt-tube.

An additional object is to provide means for maintaining the upper ends of the slats, when tilted to substantially window-shielding positions, in proper transverse alinement notwithstanding the wind.

It is also an object to provide means for preventing rattling of the slats.

It is another object to provide improved anchorage for the bottoms of the slats.

It is a further object to provide improved means for insuring noiseless operation.

It is an additional object to provide a slat bottom linkage operative to prevent accidental mutual approach of the bottoms of the slats from fully extended relation.

A further object is to provide means whereby a Venetian blind constructed for a given width of window may be readily adapted to a somewhat narrower window without requiring removal of any slat.

Another object is to provide improved tilt rod supporting means.

Additional objects are to provide an improved: installation bracket; tilt gear assembly; mounting for the tilt gear assembly; traverse cord sheave mounting; double traverse cord guide; master slide; slat-suspending hook; and bottom chain end anchorage.

Further objects and advantages of the invention will appear as the description proceeds.

The invention will be better understood upon reference to the following description and the accompanying drawings, in which:

Fig. 7 is an elevational view of the tilt gear assembly.

Referring now more particularly to the drawings, disclosing illustrative embodiments of the invention, there is shown at 30 a window casing or frame to each jamb 31 and 32 of which is secured as at 33 a dovetailed installation bracket 34 having inturned upper and lower flanges 35 affording socket grooves 36 for the telescopic reception of top and bottom wings 37 of each end bearing 38 and 39, adapted to be releasably retained in assembly with the bracket by the facia board clip 40 pivot-riveted at 41 to the bracket. The bracket 34 is formed with stops 42 which limit the extent of insertion of the wings 37, the clip 40 has cam portions 44 and 46 and a spring tongue 48 having a hole 50, and the bracket has a rounded protuberance 52. When the wings 37 of a bearing are fully inserted in the bracket grooves 36 and the clip 40 is swung into operative retaining position, the cam portions 44 and 46 engage the front ends 53 of the wings with the wings engaged with the stops 42, the protuberance 52 snapping into the hole 50 in the spring tongue 48. Thus the wings 37 are securely yet releasably retained in the installation bracket.

Figures 8, 10, 11:
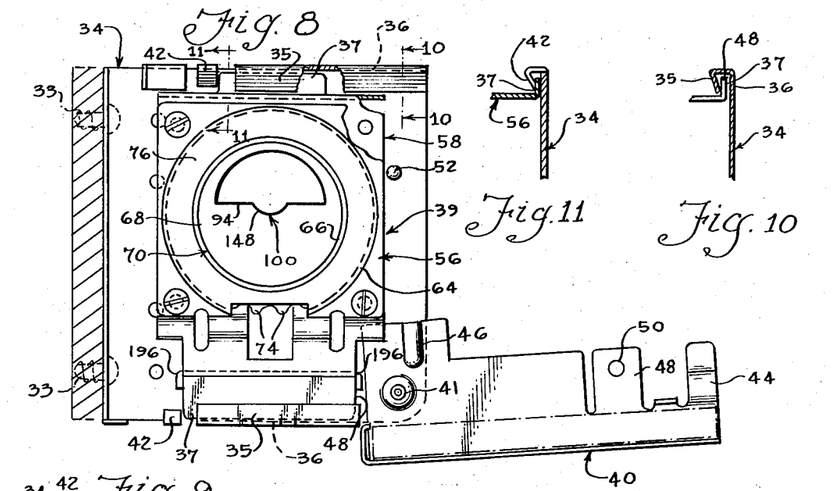
Fig. 8 is a view partly in section and partly in elevation of an installation bracket and a tilt gear assembly received thereby, with the facia board clip open.
Figs. 10 and 11 are sectional views taken as indicated by the lines 10—10 and 11—11, respectively, in Fig. 8.
Figures 9, 12, 13, 14:
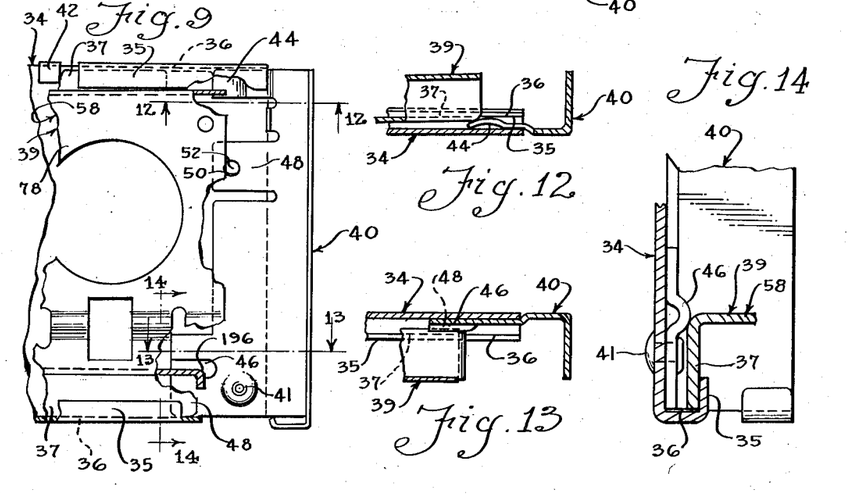
Fig. 9 is similar to Fig. 8 but shows the facia board clip in latched position.
Figs. 12, 13, and 14 (enlarged) are sectional views taken as indicated by the lines 12—12, 13—13, and 14—14, respectively, in Fig. 9.

Each end bearing may comprise a hanger including inner and outer parts 56 and 58 joined as at 60, the outer part being formed with flanges 62 from which the wings 37 extend. The inner part 58 is formed with an annular depression 64 terminating in a cylindrical flange 66 in which is journaled the hub 68 of a gear 70 having a flange 72 in which the teeth 74 are formed, the depression wall 76 and the opposite wall portion 78 of the part 56 affording thrust bearing surfaces for the faces of the gear flange. Although only one worm shaft 80 is employed, both end bearings 38 and 39 and the gears 70 supported thereby are preferably respectively identical to minimize the number of different dies necessary.

Figure 3:
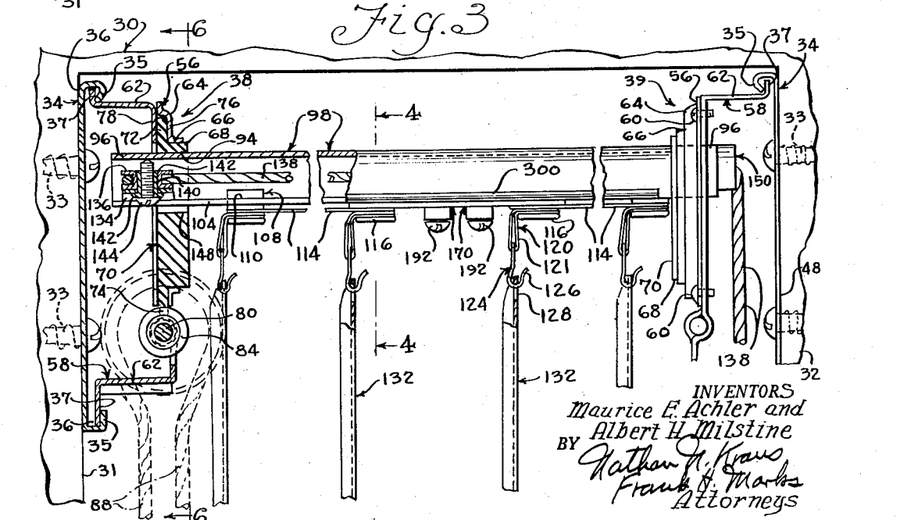
Fig. 3 is a view, partly in section and partly in elevation, of the tilt tube, tilt gear assembly, traverse mechanism, and related structure.

A worm 84 for cooperating with one of the tilt gears 70 is force fitted or otherwise suitably fixed to an intermediate portion of the worm shaft 80, mounted in the part 56 of one of the bearings, for example the bearing 38, a tilt pulley 86, actuated by a tilt-cord 88, is fixed to an end portion of the shaft, and a tilt-cord guide 90 is swiveled about the shaft.

Each gear 70 is formed with an eccentric hole 94 of generally semi-circular or other suitable formation, for the telescopic non-rotatable reception of the ends 96 of a tilt rod 98 which is preferably in the form of a tube. When the gears 70 are coaxially journaled and the tube 98 assembled therewith, the gears and tube rotate as a unit, the tube thus turning only in an orbit about the axis 100 of the gears.

Figure 1:
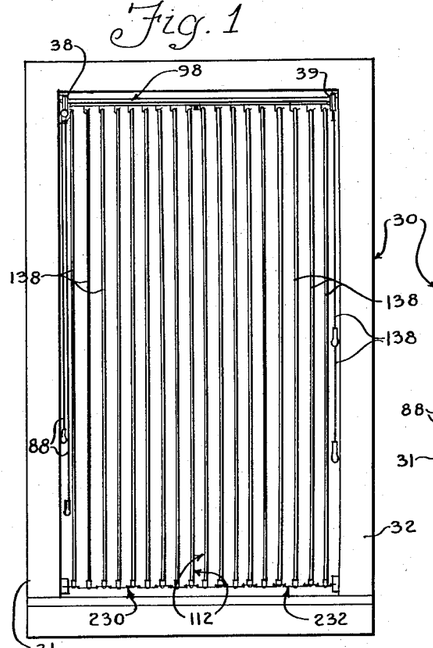
Fig. 1 is a front elevational view of a vertical Venetian blind embodying features of the invention, with the slats extended across the width of the window.
Figures 1, 4, 5, 34, 35, 36:
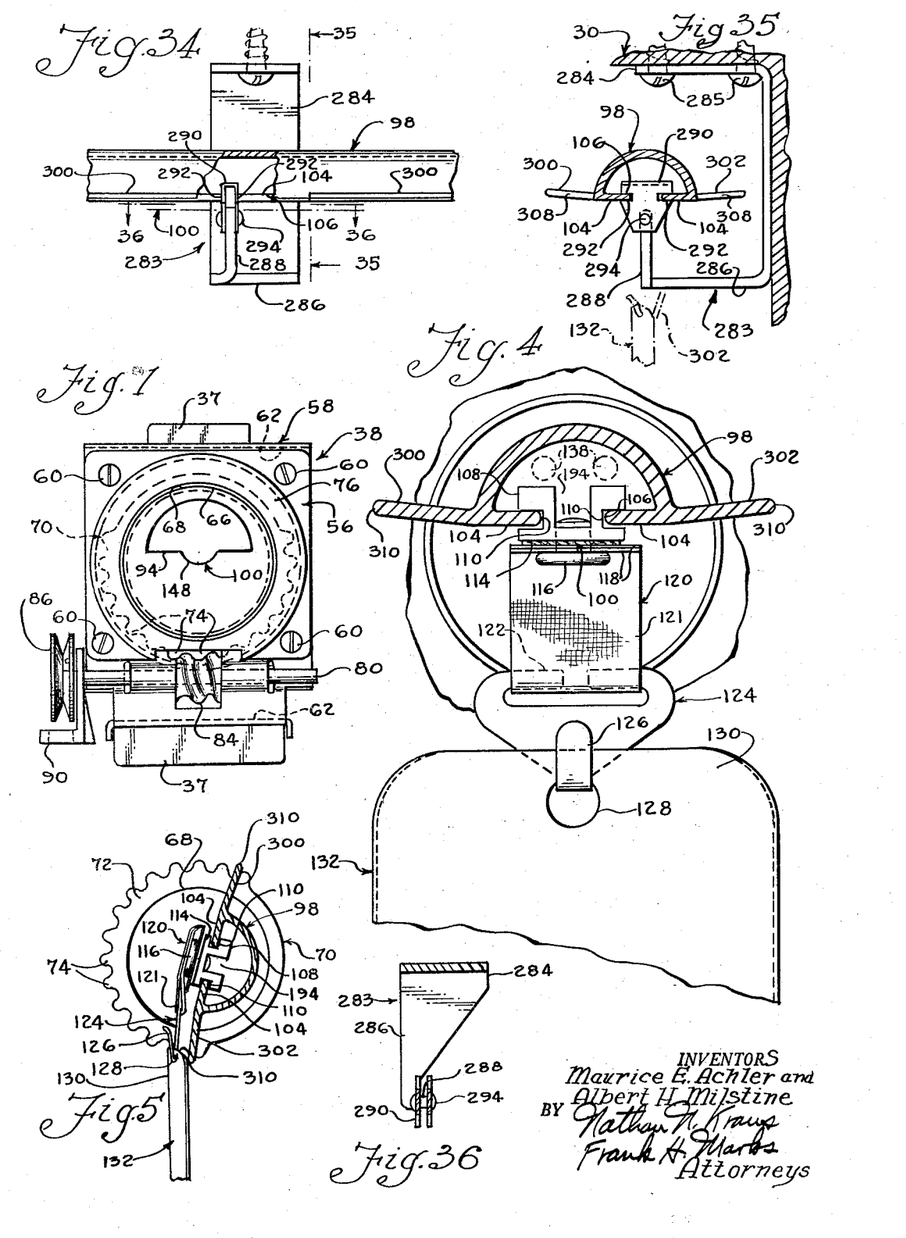
Fig. 4 is an enlarged sectional view taken as indicated by the line 4—4 in Fig. 1.
Fig. 5 is similar to Fig. 4 but shows the tilt tube fully tilted.
Fig. 34 is a view partly in section and partly in elevation showing a center support construction adapted for use with a tilt tube of such length as to be likely to sag excessively in the absence of such support.
Figs. 35 and 36 are sectional views taken as indicated by the lines 35—35 and 36—36, respectively, in Fig. 34.
Figure 19:
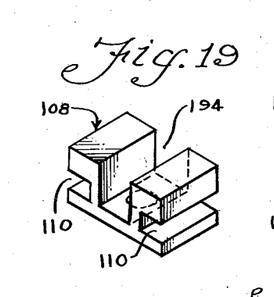
Fig. 19 is an enlarged perspective view of one of the sliders cooperating with the tilt tube.

The tube 98 has co-planar lips 104 extending toward each other and defining a slot 106 running throughout the length of the tube for the reception of sliders 108, each slider being formed with opposite co-planar grooves 110 in which the lips are slidably received.

Figure 2:
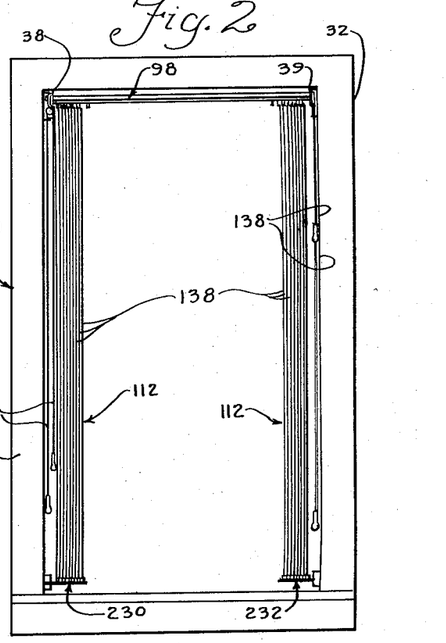
Fig. 2 is similar to Fig. 1 but shows the slat groups parted and adjacent the window jambs.

Although there may be a single group of vertical slats employed for the full width of the window casing, with means for bunching all of them toward one side of the window, we have illustrated a pair of slat groups or units 112 with means for bunching them toward the respective window jambs 31 ad 32 to afford a substantially unobstructed view through the window, as will appear.

All of the sliders 108 of each group 112 are connected in a string by a tape 114 fastened by rivets 116 to such sliders, and the ends 118 of individual relatively short tapes 120, having loops 121 releasably looped through the upper slotted ends 122 of hook elements 124, are secured by said rivets. The hook 126 of each hook element 124 is releasably received in a center hole 128 in the upper end 130 of a slat 132 in a manner to releasably support the slat and to cause the slat to rotate therewith. The slats 132 may be of any suitable width, a preferred width being two inches, in which event the sliders 108, when fully spaced from one another in each string or group 112, are arranged 1⅝″ on centers, so that the slats lap one another ⅜″ when fully overlapped.

Figures 15, 16, 17, 37:
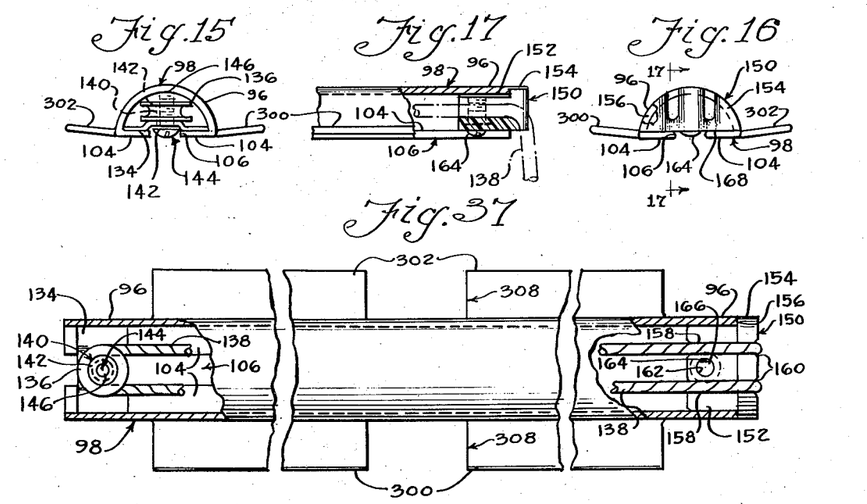
Figs. 15 and 16 are respectively left and right end elevational views of the tilt tube as seen in Fig. 3.
Fig. 17 is a sectional view taken as indicated by the line 17—17 in Fig. 16.
Fig. 37 is a plan view, partly in section and partly in elevation, showing how the tube wings would be cut out to clear the center support bracket when the tilt tube approaches and recedes from fully tilted position in either direction.

A support including a clip 134 is provided for the looping sheave 136 for the traverse cord 138, the sheave and clip being journaled about and held in assembly with an internally threaded spool 140 whose ends 142 are riveted over the clip and sheave, respectively. A screw 144 is threaded into and passes through the spool 140. When the unit is slipped into an end 96, for example the left end, of the tilt tube 98, and the screw 144 is turned until its end 146 bites against the ceiling of the tube, the clip 134 is thereby forced tightly against the lips 104 and thus the unit is removably yet securely clamped in assembly with the end of the tube. The screw head 147 is adapted to be received in the tube slot 106, and the gear 70 may be formed with a notch 148 to provide clearance for the screw head.

Figures 18, 20:
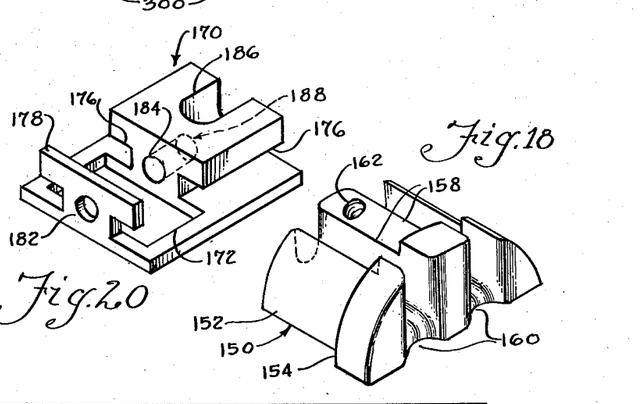
Fig. 18 is an enlarged perspective view of the traverse cord guide shown in Figs. 16 and 17.
Fig. 20 is an enlarged perspective view of one of the master slides.

For supporting and spacing the runs of the traverse cord 138 at the other end 96 of the tube 98, there is provided a guide plug 150 having a stem 152 telescoped into that end and transversely conforming to the interior of the tube, the plug having an outer end flange or head 154 which engages the terminal edge 156 of the tube. The plug 150 may be of nylon or other suitable material and is formed with preferably chamfered smooth communicating and longitudinal transverse outer end grooves 158 and 160 and a transverse threaded passage 162 in which a screw 164 is received. When the screw 164 is turned until its end 166 bites against the ceiling of the tube 98, the flat bottom 168 of the plug 150 is thereby forced tightly against the lips 104 and thus the unit is removably yet securely clamped in assembly with said other tube end 96.

Figure 21:
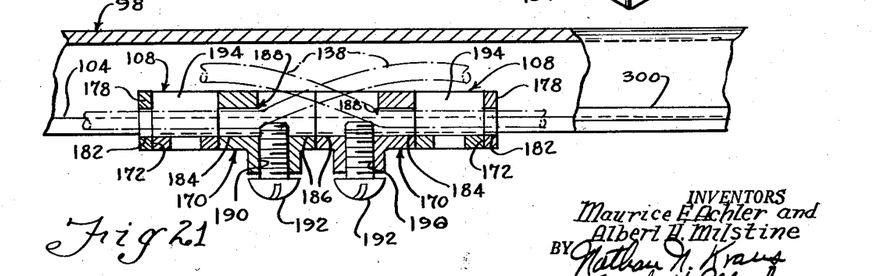
Fig. 21 is an enlarged view, partly in section and partly in elevation, of the tilt tube and associated master slides and inner end sliders assembled therewith.

For centering the blind and anchoring the runs of the traverse cord 138, we may employ a pair of identical master slides 170, each being of substantially greater length and width than a slider 108 and formed with a hole 172 in which an inner end slider 174 of each group is adapted to be telescopically received, the master slide having opposite grooves 176 adapted to register with the grooves 110 of the slider when slider and slide are assembled, so that the master slide forms part of a slider unit and is interlocked with the innermost end slide and moves as one therewith when the unit is assembled with the tube 98. The longitudinally spaced portions 178 and 180 of each master slide 170 are formed with smooth longitudinal registering holes 182 and 184, respectively, the latter communicating with a slot 186, the portion 180 thus having a preferably sharp edge 188 at the juncture of the slot with the hole 184. The master slide 170 is also formed with a tapped hole 190 transverse to the axis of the holes 182 and 184 and communicating with the slot 186, and a screw 192 is accommodated in the tapped hole. Each slider also has a through longitudinal slot 194 adapted to be disposed in line with the holes 182 and 184.

Before the tube 98 is assembled with the gears 70, the traverse cord 138 is passed first through the hole 184 and then through the hole 182 of each master slide 170, and, with said slides assembled as noted above with the respective slider strings said strings are slid into assembly with the tube, sufficient slack being provided in the cord to pass about the sheave 136, which is then mounted in one end 96 of the tube as noted above. The tube ends 96 are then telescoped into the gears 70, with the runs of the traverse cord 138 extending out of the other end of the tube, the traverse cord guide 150 is mounted as noted above in said end of the tube with the cord runs extending through the slots in the guide. The traverse cords runs depending from the guide 150 pass over one or both of the smooth rounded surfaces 296 of the bearing part 58. With the traverse cord runs held taut and the master slides 170 interengaged, the screws 192 are turned until they jam the cord runs against the edges 188 to thereby lock the runs to the master slides. The tilt gear assemblies are now mounted in the installation brackets 34, the hook elements 124 are suspended from the tape loops 121, and the slats are slipped onto the hooks 126.

The master slides 170 are so dimensioned that when they are interengaged the distance between the axes of the rivets 116 connected to the innermost end sliders 174 is the same as the spacing between the axes of adjacent rivets of each string when fully extended, said distance in the illustration given being 1⅝ inches, so that when the strings are fully extended the slats will be uniformly spaced throughout the width of the window.

Flexible caps 200 are provided to readily and releasably receive and embrace the lower ends 202 of the slats 132, said caps being formed of soft rubber, soft plastic or other suitable soft material so that, when the slats are tilted into close overlapping relation, their bottoms will not rattle inasmuch as they will not contact one another, but instead contact will take place between the caps and such contact is noiseless. Each cap 200 is formed at the bottom 204 thereof with a central hole 206 through which the shoulder 208 of a molded or other suitable generally T-shaped connector 210 passes, the head 212 of the connector being located within and at the bottom of the cap. The connector head 212 may be in the form of wings 214 extending in opposite directions longitudinally of the cap 200 and transversely offset to define a space into which the slat bottom 218 is slidably received, the slat being adapted to seat on the top of the shoulder 208 with the wings slidably engaging the respective faces of the slat. The connector stem 220 depends below the cap 200 and comprises a cylindrical neck or shank 222 terminating in a bottom flange or knob 224. The connector 210 is preferably formed of rubber, plastic or other suitable material, and the shank 222 is hollow as indicated at 226 and relatively thin-walled so as to be resiliently yieldable for a purpose which will appear.

Figure 22:
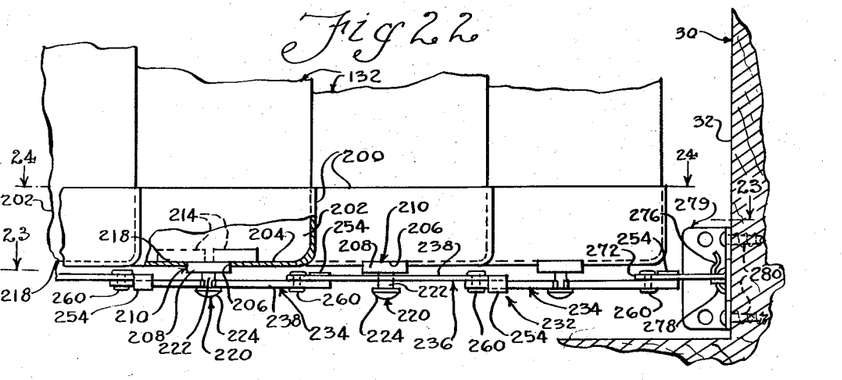
Fig. 22 is a fragmentary view, partly in section and partly in elevation, showing the slats fully lapped and extended, and the associated bottom mechanism.
Figures 25, 26:
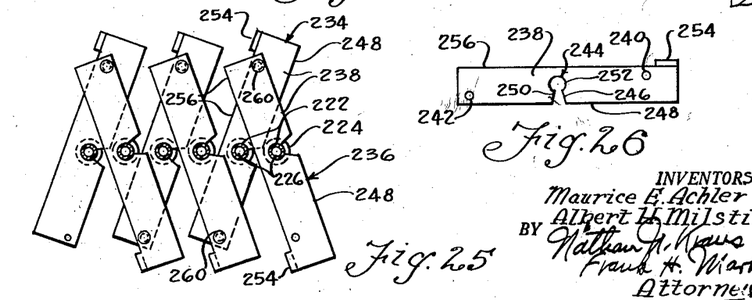
Fig. 25 shows a portion of a chain as it appears when the slats are traversed from extended relation.
Fig. 26 is a detail of a chain link.

For the purpose of maintaining proper spacing and arrangement of the bottoms of the slats 132, there is provided a pair of chains 230 and 232, one for each slat group 112. Each chain comprises a plurality of identical aluminum or other suitable links 234 and 236, each link having a flat preferably rectangular main portion 238 and diagonally opposite holes 240 and 242, an intermediate keyhole 244 with its entry passage 246 converging from a longitudinal edge 248 of the link and leading to a throat 250 and thence to an enlarged circular cul-de-sac 252 at the center of the link, and a lug 254 extending normal to and lengthwise of the main portion adjacent the hole 240 at the opposite edge 256 of the link.

The connector neck 222 is of a diameter slightly greater than the width of the throat 250, and is assembled with a link by placing the neck in the keyhole entry 246 and flexing the neck past the throat until the neck snaps into the cul-de-sac 252 to loosely and pivotally connect the link to the connector 210 with the connector stem knob 224 disposed below the link.

The links 234 are alternately pivotally connected to the links 236 as by rivets 260, with the main portions 238 of the links 234 at one level and the main portions of the links 236 at another level, as shown, successive links being reversed so that the lugs 254 depend from one set of links and rise from the other set of links. Mutual pivoting of adjacent links 236 and 234 is limited by engagement of the lug 254 of each link with the longitudinal edge 256 of the adjacent links, so that the links are pivoted together in jackknife relation.

Figures 27, 28, 29:
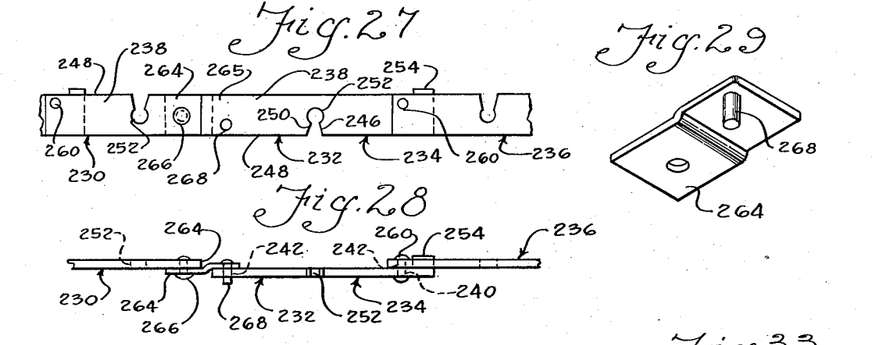
Figs. 27 and 28 are respectively top plan and side elevational views showing how the chains are releasably coupled together.
Fig. 29 is an enlarged perspective view of the coupling element appearing in Figs. 27 and 28.

The end link of one chain, for example the chain 230, is snipped to provide a stub 264 to which a strip 266 is fastened as at 267, the strip having a hook end 268 whose axis is equidistant with the link pivot axis of the stub from the axis of the cul-de-sac 252 in the stub. With the chain 230 arranged so that the hook end 268 projects downward, and with the chain 232 arranged so that one of its links 236 is innermost, it is apparent that the hook end may be releasably passed down into the adjacent end hole 242 in said inner link, forming a linkage which is in operation when the slider strings and slat groups 112 are fully extended. The links are so dimensioned that when the chains are fully extended, the axes of the cul-de-sac 252 and thus of the connector stems 220 are 1⅝ inches apart, corresponding to the spacing of the axes of the tape rivets 116 when the slider strings are fully extended.

Figures 23, 24:
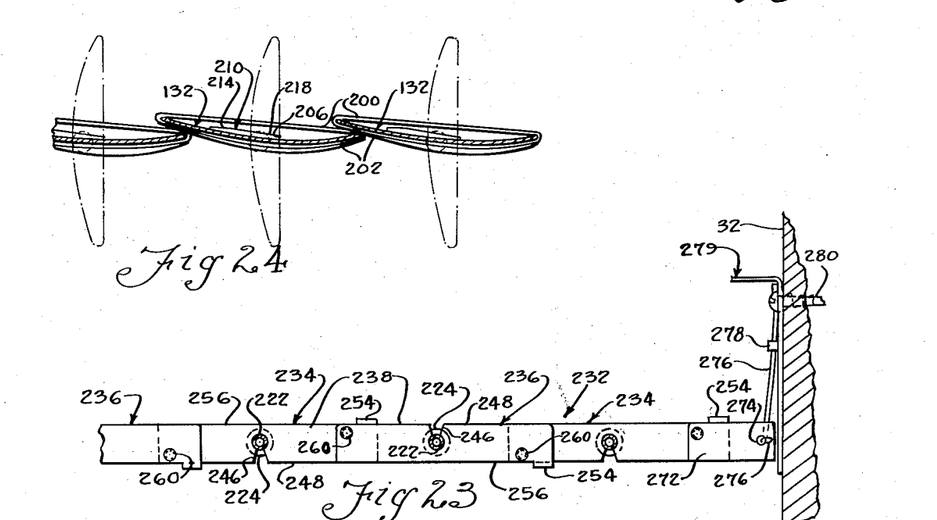
Figs. 23 and 24 are sectional views taken as indicated by the lines 23—23 and 24—24, respectively, in Fig. 22.
Figure 30:
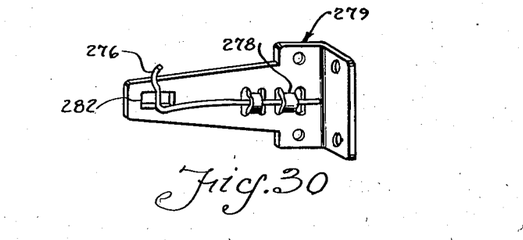
Fig. 30 is a perspective view of a spring anchoring device for the left end of the left chain, a plan view of its counterpart for the right end of the right chain appearing in Fig. 23.
Figure 31:
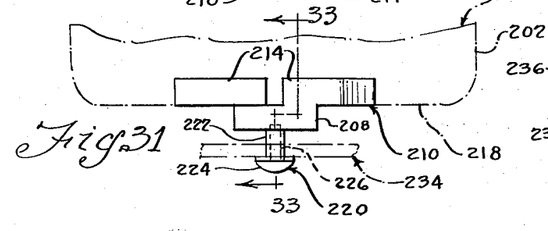
Figs. 31 and 32 are respectively enlarged elevational and top plan views of one of the connectors shown in Fig. 22, for releasably suspending the chains from the caps receiving the bottoms of the slats.
Figure 32:
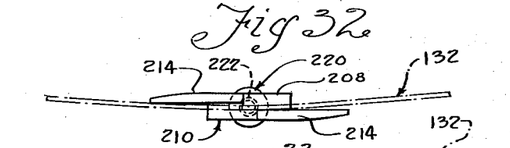
Figure 33:
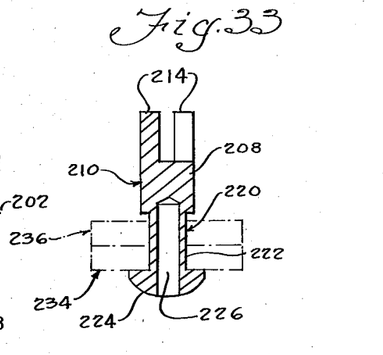
Fig. 33 is an enlarged sectional view taken as indicated by the line 33—33 in Fig. 31.

Each chain at its outer end has a preferably relatively short anchor link 272 having an outer end hole 274 adapted to removably receive a spring wire 276 anchored as at 278 to a bracket attached as at 280 to the window frame, the bracket having a slot 282 to provide clearance for the anchor link.

When the chains 230 and 232 are connected together and anchored at their outer ends, the chains extend in the same straight line and the sliders are fully traversed so that the axes of rotation of the slats are at 1⅝ inch intervals throughout the width of the window, and that interval is maintained irrespective of the degree of tilt of the slats. Should the window be open at the bottom and a breeze be coming into the house, the line of slats will not be bowed by the breeze, due to the fact that the jackknife character of the chains will maintain the chains in a straight line when the breeze is in that direction.

When the chains 230 and 232 are disconnected from each other, and the traverse cord 138 pulled in the direction to collapse the slat groups, the master slides 170 will first move outward and then progressively force the sliders one by one outward until the cord is released or all of the sliders of each group are bunched adjacent the respective jamb. As the movement commences, the innermost connector 210 of each group 112, by reason of its tendency to move outward, exerts an outward force on the link to which it is connected. The pivot connection between that link and the next outer link being offset from the direction of that force, it follows that a toggle-like action takes place, the two links just mentioned pivoting relative to each other. As the traverse continues, the second and third innermost links also pivot relative to each other, and so on depending on the extent of traverse, and when the traverse is complete all of the links will have pivoted to provide a zig-zag effect, so that the connector stems move in unison with the sliders and thus the slats remain parallel to one another. When reverse traverse takes place, the innermost sliders again move first, and the innermost connectors move in unison therewith to gradually extend the slider strings and the chains to the desired extent, said strings and chains being fully extended when the master slides 170 are again interengaged.

The connectors 210 are preferably identical, so that the knobs 224 of alternate stems 220 support one set of alternate links 234, and these links thus support the other set of links 236, so that the knobs of the stems passing through the links 236 are spaced below the latter links.

Each slat 132 may be assembled with the holding means therefor simply by inserting the lower end 202 of the slat in the cap 200 provided therefor as shown and described and slipping the upper end of the slat onto a tape hook 126, and it is obvious that the task of applying and removing the slats is an exceedingly quick and easy one.

When the tube 98 is arranged with its lips 104 in a horizontal plane at the bottom of the tube, the intermediate portions 270 of each slat suspending tape 120 and consequently the longitudinal edges of each slat 132 extend in planes substantially normal to the window pane. When the tilt cord 88 is pulled and accordingly the tube 98 is turned from the position just noted, each suspending tape 120 follows the path of least resistance pursuant to the gravity pull of the slat suspended thereby, with the result that the tape folds more and more acutely adjacent the head of the rivet 116 by which it is anchored, and the fold line changes from one which falls in a plane normal to the window pane to one which falls in panes more and more acutely inclined to the window pane, said portions 270 of the several suspending tapes turning more and more toward a common plane, and thus likewise turning the slats 132 so that when said tape portions lie substantially in a plane parallel to the window pane, the slats are in fully overlapped relation, virtually blocking passage of light therebetween. The tube 98 will remain in any position to which it is subjected by the tilt cord 88.

It will be noted that the riveted portions 118 of the slat-suspending tapes 120 are substantially bisected by the gear axis 100 and thus remain so bisected irrespective of the degree of tilt or the non-tilt of the tube 98, so that there is no appreciable rise or descent of the longitudinal centerline parts of said tape portions, and consequently no rise or descent of the slats 132 notwithstanding tilting of the tube.

Other vertical slat venetian blinds are so constructed that they fit windows of predetermined size and shape, and cannot be changed at all, or certainly not by an unskilled person, to fit windows for which they were not designed, so that when a person moves to another house or apartment where the windows are of different size or shape, the venetian blinds used in the prior home are useless to him and he must undergo the expense of furnishing his new home with a new set of venetian blinds.

These disadvantages are not present in our construction.

If the new window is of substantially greater height than that for which a given venetian blind of the present invention is designed, but of substantially the same width, all that is necessary is that a new set of slats of appropriate length, and nothing else, be purchased and substituted for the original slats.

If the new window is of substantially less height than but of substantially the same width as the old one, nothing need be purchased, since all that is necessary is that the lower ends of the slats be sheared off with a scissors or shears to proper length and slipped into the caps 200, no skill being required. Since the bottoms of the slats are hidden by the caps, it is unnecessary to round off the bottoms of the slats.

If the new window is of substantially the same height as the old one, but substantially wider, it is necessary merely to replace the old tilt tube and slider assembly with a new tube and slider assembly of the proper length and to purchase also the number of additional slats, connectors, caps and links needed. These parts may be purchased and readily installed and assembled by the housewife, the original chains being first uncoupled from the end springs and the additional links coupled to the original chains and springs.

If the new window is of substantially the same height as the old one, but substantially narrower, all that need be done is to saw off portions of the ends of the tilt tube and corresponding portions of the wings to bring the tube to the correct form and length, snip off the outer end portions of the draw tapes 104 to remove the proper number of sliders 108, remove the outer end links of the chains and the corresponding caps 200 and recouple the chains to the end springs, remove the same number of slats, and assemble the remaining parts.

Where a vertical venetian blind is designed for a given window casing width and a window casing is encountered which is too narrow to properly accommodate that blind but yet is so wide that removal of an end slat will leave a marginal portion of the window visible at all times, the present construction may be very easily and quickly adapted by the installer to such a casing. In such a case, the installer snips off equal lengths of the formerly adjoining ends of the two outermost end links 234 and 236 of one of the chains, laps the resulting link ends, punches holes in the lap portions, and applies a pivoting rivet thereto. The amounts cut off should preferably be such that when the links are re-pivoted and are arranged in line the distance between the axes of the cul-de-sacs 252 of the last two links shall have been reduced substantially by the distance by which the width of the window casing for which the blind was originally designed exceeds the width of the actual window casing. Now when the slat group is fully extended and the slats are not mutually lapped, the space between the two outermost slats will be slightly less than the other slat spacing, but this fact will be hardly noticeable, and when the slats are tilted to any substantial degree, the spacing difference will in practical effect be unnoticeable. For the purpose of symmetry, a change may be made for both sides of the window casing, in which event each amount cut off will be reduced to effect the same over all reduction as above.

As is evident from the foregoing, even in manufacture it is not necessary to give the bottoms of the slats any special attractive finish, such for example as rounding them as shown, inasmuch as in use they are concealed by the caps 200.

It is also apparent from the foregoing that to adapt a given vertical venetian blind according to our invention from one window to another of different height or width or both height and width, the corresponding changes as noted above are all that are required, none requiring any skill, so that it is unnecessary to purchase or install a completely new venetian blind, and only in certain cases, and then only for minor work, need the services of a venetian blind installer be engaged. And, whatever changes may be needed, they in no event will involve the installation brackets, the end bearings, the gears (into which the tilt tube is removably telescoped), the tilt gear driving mechanism, nor the traverse cord with its looping sheave unit and the traverse cord run guide.

If desired, the positions of the sheave unit and traverse cord guide may be reversed to locate both the tilt cord and the traverse cord ends adjacent the same side of the window, either right or left, as desired, so that, particularly where the window is very wide, and it is desired to adjust the slats at the same time by both traversing and tilting, both operations may be performed by the same person without necessitating his walking from one side of the window to the other to make such adjustments.

Where the tilt tube 98, by reason of its length, would tends to sag between its ends 96, this tendency is overcome by means of a supporting structure adapted to be applied midway of the length of the tube. An illustrative embodiment of such a structure is shown generally at 274 and may comprise a bracket 276 having upper horizontal and rear vertical portions 278 and 280 formed with holes for the reception of screws 284 so that the bracket may be suitably mounted on the window casing 40 or other suitable support. The bracket 276 has a lower forwardly extending portion 286 having a front upstanding terminal 288 extending in a plane normal to the window pane and adjacent and below the mid-point of the tilt tube 98. A U-shaped member 290 normal to the window pane and having side grooves 292 like those of the sliders may be passed sidewise between the tube lips 104 and then turned and, like the sliders, assembled with the tube 98, the member projecting out of the tube and between the master slides 170, said member being pivotally connected at 294 with the bracket terminal 288 below the axis 100 of the gears 70. It is thus apparent that material sagging of the tube 98 is precluded. Where the sagging of the tube 98 is so slight as not to materially affect operation or appearance, the structure 274 just described may be omitted. Since the member 290 may be made to occupy a very small space lengthwise of the tube 98, it follows that in view of the usual manufacturing tolerances the presence of said member will not materially affect the appearance of the blind as a whole.

The tube 98 also includes longitudinal flanges or wings 300 and 302 terminating short of the tube ends 96 in order not to interfere with assembly of the tube ends with the gears 70. While the tilting slats 132 are approaching overlapped relation, should one or more of the slats accidentally lag, the wings will come into play and nudge the lagging slats, one wing being operative when the slats are turning in one direction toward overlapped relation and the other wing being operative when the slats are turning in the opposite direction toward overlapped relation. Where a supportive structure 274 is employed, the wings should be notched, as shown at 308, to clear the bracket 276 so that the bracket will not interfere with tilting of the wings.

Figure 6:
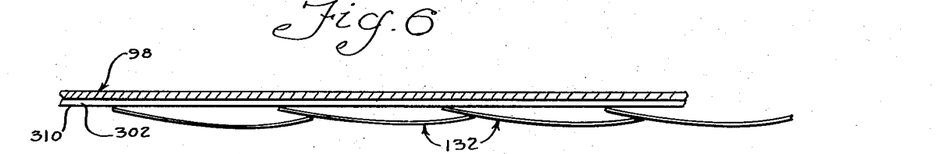
Fig. 6 is a sectional view at right angles to Fig. 5, showing the contact between the slats and a wing of the tilt tube.

When the slats 132 are in neutral positions (i. e., in planes generally normal to the window pane), and during a substantial angle of turning of the slats from said positions, the wings 300 and 302 are clear of the slats. The slats of course turn coincidentally with the turning of the tube 98, so that, as the tube turns from neutral position, one of the wings moves into proximity with the upper ends of the slats, and, if there are any lagging or recalcitrant slats, they will be nudged and swung by that wing toward the position they should occupy in relation to the other slats. At the completion of the turn of the tube 98, the wing edge 304 comes into engagement with all of the slats and holds the upper ends of the slats slightly displaced laterally from the vertical plane in which their axes are located when the slats are freely suspended, so that there is a substantial lateral pressure on the upper ends of the slats resulting from the gravitational tendency of the slats to resume their freely suspended positions. The displacement is insufficient, however, to produce any noticeable change in the appearance of the blind. Under these circumstances, rattling of the upper ends of the slats and bowing of the string of slats such as would be occasioned by a breeze are obviated. When the tube is return-tilted to turn the slats out of lapped relation, the wing edge gradually recedes clear of the upper ends of the slats, allowing them to turn properly.

The wings may be arranged at any suitable angle with each other to attain the results above noted, an angle of about 168°, with the wings inclining upward from the lips 104 when the tube 98 is in neutral position, being suitable.

It is apparent from the foregoing that we have provided a Venetian blind construction affording among other things improved tilt tube bearing means, and supports therefor; improved mounting for the traverse cord sheave; an improved traverse cord guide; an improved tilt tube operating to assure lapping of all of the slats; an improved chain structure whereby alinement of the slats in fully extended arrangement is assured; and means whereby rattling of the slats is prevented.

The blind may be installed at the front face of the window frame instead of between the jambs as shown, as where a single elongated blind is used in confronting relation to two or more windows arranged next to one another.

The various sliders could be formed with relatively narrow marginal edge portions, preferably rounded, for engagement with the inner surfaces of the tube lips to minimize sliding friction.

The slats may be formed of sheet aluminum, steel or other suitable metal, or of wood, plastic or other suitable material, and are preferably formed of sheet steel, enameled if desired, and preferably transversely bowed substantially as shown.

The gears 70, sliders 108, master slides 170, and tilt cord guide 150 are preferably formed of molded nylon, but may be of other suitable material.

Various modifications may suggest themselves to those skilled in the art without departing from the spirit of our invention. Hence we do not wish to be restricted to the specific forms shown or uses mentioned, except to the extent indicated in the appended claims, which are to be interpreted as broadly as the state of the art will permit.

We claim:

1. In a vertical Venetian blind, horizontal support means, a series of slats depending therefrom in vertical position, a connector stem depending medially from the lower edge of each slat, a chain comprising a plurality of substantially flat links in a horizontal plane with adjacent links being pivotally connected together substantially at their end portions with said end portions in lapped relation, each of said links having an aperture substantially centrally thereof in which is engaged one of said connector stems, each of said links having a lug at one edge of an end portion thereof affording a stop to limit pivotal movement between adjacent links in one direction, said links when said chain is fully extended being arranged in linear alignment, and controlling the spacing between the lower ends of said slats.

2. The invention as defined in claim 1 in which the aperture is a keyhole slot affording detachable pivotal engagement with a connector stem.

3. In a vertical Venetian blind, horizontal support means, a series of slats depending therefrom in vertical position, a chain comprising a plurality of substantially flat links in a horizontal plane with adjacent links being pivotally connected together, means affording pivotal connection between substantially the middle of a link and the lower end of a respective slat, means on one end of each of said links affording a stop to limit pivotal movement between adjacent links in one direction, said links when said chain is fully extended being arranged in linear alignment, and controlling the spacing between the lower ends of said slats.

References Cited in the file of this patent

UNITED STATES PATENTS

| | | |
|---|---|---|
| 1,649,934 | Boeck | Nov. 22, 1927 |
| 1,858,801 | Bolard | May 17, 1932 |
| 2,173,275 | Houmere | Sept. 19, 1939 |
| 2,200,510 | Lorentzen | May 14, 1940 |
| 2,207,393 | Anderson | July 9, 1940 |
| 2,212,718 | Pratt | Aug. 27, 1940 |
| 2,591,775 | Bopp et al. | Apr. 8, 1952 |
| 2,604,159 | Wright | July 22, 1952 |
| 2,605,824 | Armstrong | Aug. 5, 1952 |
| 2,625,219 | Peck | Jan. 13, 1953 |
| 2,670,167 | Nelson | Feb. 23, 1954 |
| 2,680,480 | Harju | June 8, 1954 |
| 2,756,817 | Toti | July 31, 1956 |
| 2,785,745 | Toti | Mar. 19, 1957 |